(12) United States Patent
O'Hara et al.

(10) Patent No.: US 6,687,081 B1
(45) Date of Patent: Feb. 3, 2004

(54) DISK DRIVE USING SEEK PROFILE TO ENHANCE FLY HEIGHT CONTROL

(75) Inventors: Matthew O'Hara, Berkeley, CA (US); Don Brunnet, Pleasanton, CA (US); Yu Sun, San Jose, CA (US); David M. Sigmond, Superior, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/570,799

(22) Filed: May 15, 2000

(51) Int. Cl.[7] .............................................. G11B 5/596
(52) U.S. Cl. .................. 360/78.07; 360/78.04
(58) Field of Search ........................... 360/78.07, 73.03, 360/75, 31, 78.01, 78.04

(56) References Cited

U.S. PATENT DOCUMENTS

| | | | | |
|---|---|---|---|---|
| 4,937,689 A | * | 6/1990 | Seaver et al. ............ | 360/78.07 |
| 5,589,996 A | * | 12/1996 | Patrick et al. ............ | 360/73.03 |
| 5,677,808 A | * | 10/1997 | Cha et al. ................. | 360/78.07 |
| 6,351,341 B1 | * | 2/2002 | Lee et al. ....................... | 360/75 |
| 6,411,458 B1 | * | 6/2002 | Billings et al. ................ | 360/75 |
| 6,452,735 B1 | * | 9/2002 | Egan et al. ..................... | 360/31 |

* cited by examiner

Primary Examiner—David Hudspeth
Assistant Examiner—Fred F. Tzeng
(74) Attorney, Agent, or Firm—Tejpal S. Hansra

(57) ABSTRACT

A disk drive uses seek profile manipulation to provide enhanced transducer fly height control. The maximum seek velocity that is used during a seek operation is made dependent upon, among other things, the direction associated with the seek operation (i.e., either radially inward or radially outward with respect to the disk). In a preferred embodiment, the maximum seek velocity in a direction that normally results in a fly height loss is made less than the maximum seek velocity in the opposite direction. Thus, a minimum transducer fly height can be maintained with minimal effect on average seek time in the disk drive. In one approach, the maximum seek velocity values are stored within a lookup table within the disk drive.

43 Claims, 6 Drawing Sheets

| Initial Track | Target Track | Maximum Velocity |
|---|---|---|
| Region 1 | Region 2 | $C_{1,2}$ |
| Region 1 | Region 3 | $C_{1,3}$ |
| Region 1 | Region 4 | $C_{1,4}$ |
| Region 1 | Region 5 | $C_{1,5}$ |
| Region 2 | Region 3 | $C_{2,3}$ |
| Region 2 | Region 4 | $C_{2,4}$ |
| Region 2 | Region 5 | $C_{2,5}$ |
| Region 3 | Region 4 | $C_{3,4}$ |
| Region 3 | Region 5 | $C_{3,5}$ |
| Region 4 | Region 5 | $C_{4,5}$ |

DISK DRIVE USING SEEK PROFILE TO ENHANCE FLY HEIGHT CONTROL

FIELD OF THE INVENTION

The invention relates generally to digital data storage systems and, more particularly, to disk-based data storage systems.

BACKGROUND OF THE INVENTION

A disk drive is a data storage device that stores data in concentric tracks on a disk. Data is written to or read from the disk by spinning the disk about a central axis while positioning a transducer near a target track of the disk. During a read operation, data is transferred from the target track to an attached host through the transducer. During a write operation, data is transferred in the opposite direction. In addition, multiple data conversion operations are generally performed in the path between the transducer and the host during read and write operations. When a request to perform a read or write operation is received, a disk drive will often have to perform a seek operation to move the transducer from a current position to the target track indicated in the request before a data transfer can take place. A servo control loop is generally provided for controlling the motion of the transducer during seek and other operations.

During typical disk drive operation, the transducer does not contact the surface of the disk. Instead, the transducer rides along a cushion of air generated by the motion of the disk. The transducer is normally mounted within a slider structure that provides the necessary lift in response to the air currents generated by the disk. The distance between the transducer/slider and the disk surface during disk drive operation is known as the "fly height" of the transducer. Because the transducer is held aloft during disk drive operation, friction and wear problems associated with contact between the transducer and the disk surface are usually avoided. However, situations may arise where the transducer temporarily contacts the surface of the disk during normal operation. For example, distortions on the disk surface known as asperities can produce regions of reduced fly height that sometimes result in contact between the transducer/slider and the disk surface, which in turn causes thermal asperities in the read signal. In addition, some common disk drive operating events are known to cause a reduction in fly height that can result in transducer/disk contact. For example, it is well known that performing a seek operation in a direction that is radially outward with respect to the disk axis of rotation will typically result in a reduction in fly height. Contact between the transducer/slider and the disk surface caused by such mechanisms should be kept to a minimum to prolong disk drive life and to ensure reliable disk drive operation.

Therefore, there is a need for a method and apparatus for reducing the likelihood of contact between the transducer and the disk surface within a disk drive. There is also a need for a method and apparatus that is capable of providing some degree of control over transducer fly height in a disk drive.

SUMMARY OF THE INVENTION

The present invention relates to a disk drive that utilizes seek velocity as a means to control the transducer fly height in the disk drive. In a preferred approach, the disk drive uses a maximum seek velocity value during seek operations that varies based on the particular seek operation being performed. The maximum velocity value that is used for a particular seek is preferably chosen based on the competing concerns of seek time and minimum fly height. In a preferred embodiment, the disk drive uses a different maximum radial transducer velocity during an outward directed seek operation than it does for an inward directed seek operation. In this manner, large reductions in fly height during outward directed seeks are avoided with minimal impact on the average seek time of the disk drive.

In one embodiment, a velocity profile generator within a seek controller is used to generate a seek velocity profile for each seek operation. A closed loop feedback arrangement is then used during the seek operation so that the actual transducer velocity follows the seek velocity profile to a relatively high degree of accuracy. The maximum velocity of the seek velocity profile for each seek operation is selected based upon fly height concerns associated with the individual seek operation. At a minimum, this means that a different maximum profile velocity will be used for inward and outward seeks. Thus, the direction of a newly requested seek operation is first determined and then a unique maximum velocity value corresponding to that direction is used to generate the seek velocity profile for the seek operation. In an extension of this technique, unique maximum seek velocity values can also be specified as a function of radial position (e.g., on a zone by zone basis) in addition to the seek direction. These values are preferably stored within a memory in the disk drive and subsequently accessed when a corresponding seek operation is to be performed.

Using the principles of the present invention, the likelihood of transducer/disk contact during seek operations can be reduced significantly, thus improving overall disk drive reliability. In addition, the inventive principles can be used to improve tribology margin in the disk drive without requiring a radical change in the transducer/disk interface (and the expense associated therewith). Furthermore, the inventive principles provide a flexible method for lowering the overall separation between the transducer and the disk without risking contact therebetween during seek operations.

DETAILED DESCRIPTION OF A PREFERRED EMBODIMENT

Figure 1:
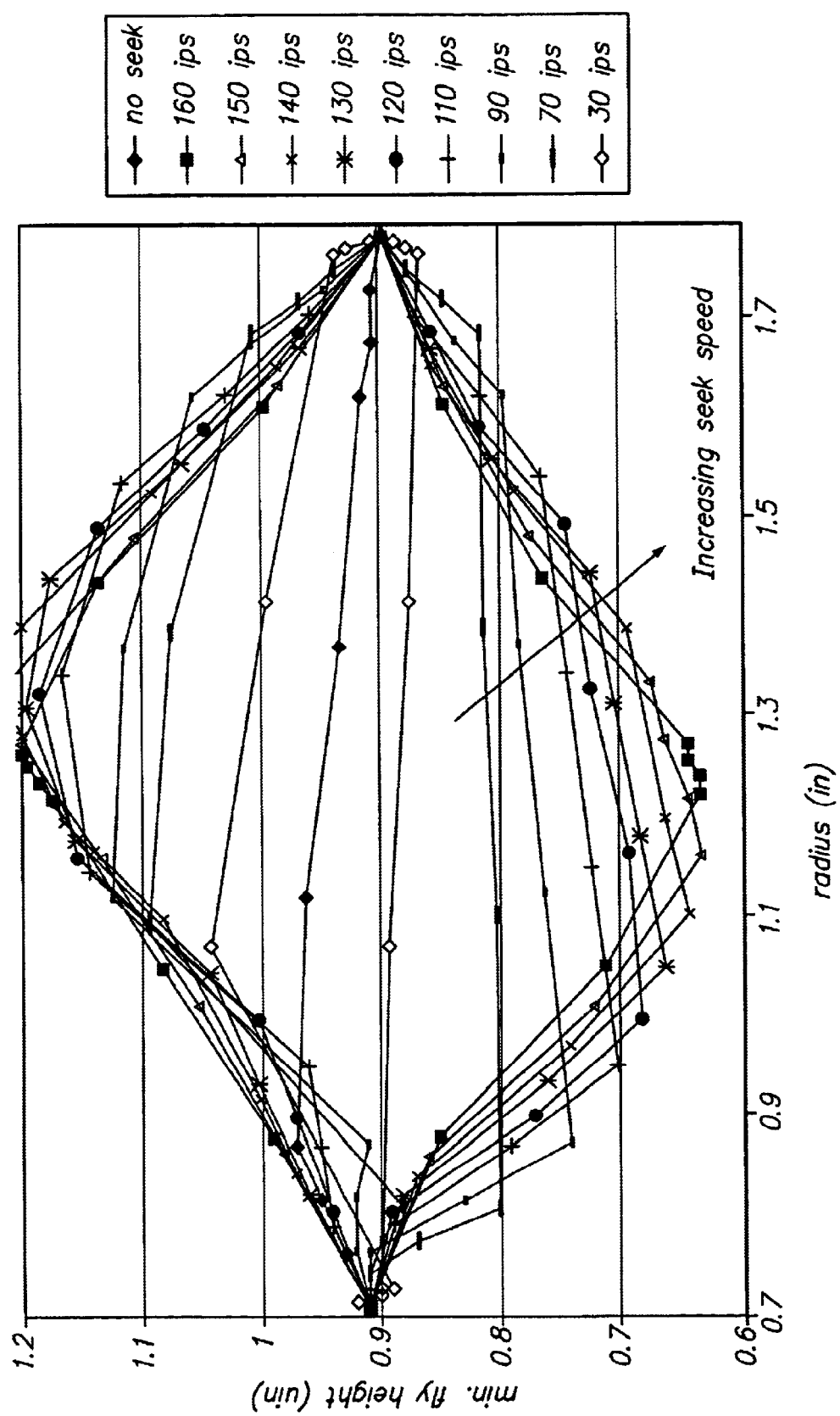
FIG. 1 is a graph illustrating typical minimum transducer fly height curves for a disk drive.

FIG. 1 is a graph illustrating typical minimum transducer fly height curves for seek operations having a number of different maximum seek velocities. As illustrated, the lower curves in the graph correspond to outward directed seeks (i.e., seeks where the transducer moves toward the outer diameter of the disk) and the upper curves in the graph correspond to inward directed seeks (i.e., seeks where the transducer moves toward the inner diameter of the disk). Thus, the outward directed seeks are shown to experience a loss in fly height during the seek while the inward directed seeks experience a gain in fly height during the seek. In addition, the overall gain or loss in fly height is shown to be directly related to the maximum seek velocity that is used during the corresponding seek operation (see legend 5 in FIG. 1). In conceiving of the present invention, it was determined that the seek velocity profiles used during seek operations in a disk drive could be used to provide an additional degree of control over transducer fly height in the drive. Preferably, this control is achieved by varying the maximum seek velocity used by the drive based on a characteristic of the seek operation being performed. In addition, it was determined that the impact of varying maximum seek velocity on average seek time within the disk drive could be minimized by utilizing a different maximum seek velocity during an outward directed seek than is used during a corresponding inward directed seek.

Figure 2:
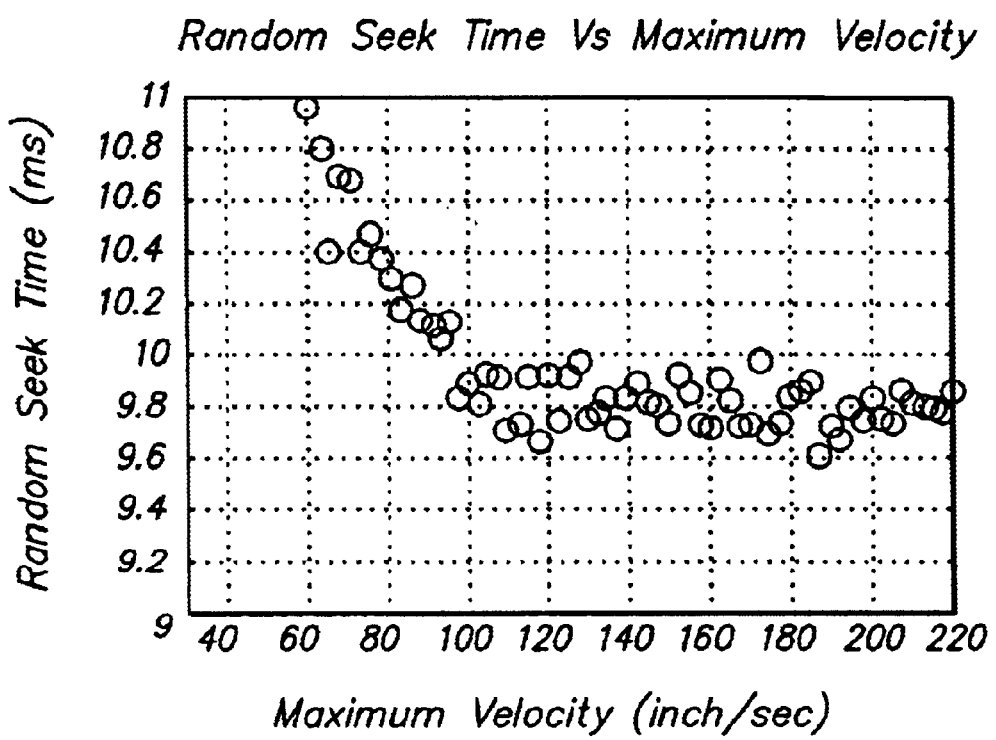
FIG. 2 is a graph illustrating the relationship between random seek time and maximum seek velocity in a typical disk drive.

FIG. 2 is a graph illustrating the relationship between random seek time and maximum seek velocity in a typical disk drive. Traditionally, disk drives have used the same maximum seek velocity for all seeks greater than a predetermined length, regardless of seek direction. This maximum velocity was usually selected based upon the mechanical properties of the disk drive. For example, the disk drive corresponding to the graph of FIG. 2 may have used a maximum seek velocity of 140 inches per second (ips) for all seek operations. As shown in FIG. 2, this maximum velocity results in a random seek time of about 9.8 milliseconds (ms). Referring back to FIG. 1, it is seen that a reduction in maximum seek velocity from 140 ips to 90 ips will generate a significant reduction in fly height loss during outward directed seek operations. This reduction can significantly reduce the likelihood of contact between the transducer and the disk during outward directed seek operations. However, FIG. 2 shows that the same reduction in maximum seek velocity will increase the random seek time by approximately 150–200 microseconds.

As illustrated in FIG. 1, the inward directed seeks do not experience a reduction in fly height and, therefore, do not need a reduction in maximum seek velocity to maintain a minimum fly height. However, reference to FIG. 2 shows that a reduction in maximum seek velocity during an inward directed seek from the previous value of 140 ips to a new value of 120 ips will generate a negligible change in random seek time and is thus desirable. Therefore, by using different maximum velocity values during the inward and outward seeks, the overall reduction in seek time will be less than one-half, on average, of the 150–200 microsecond reduction caused by the outward directed maximum seek velocity reduction (it is less than one-half because relatively few seek operations generally start at ID). In one embodiment, maximum velocity values used during outward directed seeks are each at least 10 inches per second less than at least one maximum velocity value used during an inward directed seek. In another embodiment, the outward directed values are at least 20 inches per second less.

Using the approach described above, or a similar technique, individual maximum velocity values are determined for inward and outward directed seek operations. These values are then programmed into the seek controller functionality (or stored within an addressable memory within the disk drive) so that each outward directed seek uses a maximum seek velocity value that is different from a value used for a corresponding inward directed seek. In addition to seek direction, maximum seek velocity values can also be specified as a function of radial position on the disk surface (e.g., zone, initial track location, target track location, etc.). In one embodiment, seek velocity values for different radial positions are stored within a lookup table within the disk drive. The lookup table is then accessed by the seek controller based on one or more characteristics of a present seek operation.

In a preferred approach, maximum seek velocity values are generated during the disk drive design phase based on a sample of drives. These values are then programmed or stored into each of the drives in a corresponding production run. In an alternative approach, a unique set of maximum seek velocity values is determined for each individual drive in the production run during drive test. This unique set of values is then programmed or stored within the corresponding disk drive before the drive is shipped. In yet another approach, an equation or program for generating a maximum velocity value is developed during the design stage and implemented within each disk drive.

Figure 3:
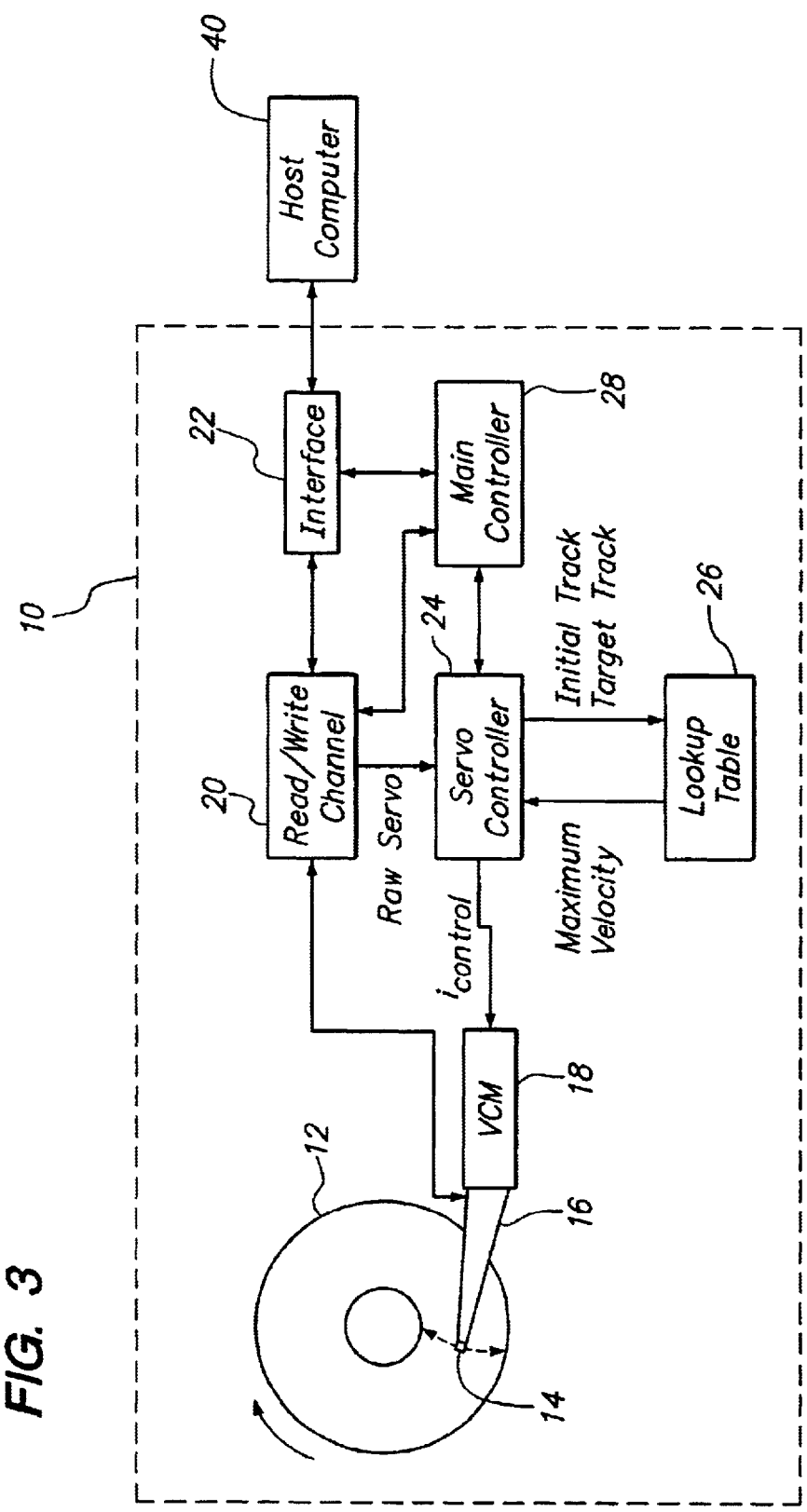
FIG. 3 is a block diagram illustrating a disk drive system in accordance with one embodiment of the present invention.

FIG. 3 is a block diagram illustrating a disk drive 10 in accordance with one embodiment of the present invention. As illustrated, the disk drive 10 includes: a disk 12, a transducer 14 (within a slider assembly), an actuator arm 16, a voice coil motor 18, a read/write channel 20, an interface 22, a servo controller 24, a lookup table 26, and a main controller 28. The disk drive 10 is coupled to an external host computer 40 that uses the disk drive 10 as a mass storage device. The disk drive 10 receives read and/or write requests from the host computer 40 and carries out the requests by performing data transfers between the disk 12 and the transducer 14. Although modern disk drives typically include multiple data storage disks arranged in a vertical stack arrangement, for purposes of convenience, the discussion that follows will describe the invention in the context of a disk drive having a single disk surface.

The interface 22 is operative for providing an interface between the disk drive 10 and the host computer 40. During read and write operations, the interface 22 provides a communications path between the host 40 and the read/write channel 20. In addition, the interface 22 is operative for receiving commands and requests from the host 40 and for directing them to the main controller 28.

The voice coil motor 18 is operative for controllably positioning the transducer 14 with respect to the disk 12 in response to a control signal (e.g., $i_{control}$) generated by the servo controller 24. The main controller 28 instructs the servo controller 24 to move the transducer 14 to a particular target track to perform a requested read or write operation. The servo controller 24 then generates the control signal to move the transducer 14 from a present position to the indicated target position. This process is known as a seek operation. Once the transducer 14 has arrived at the target track, the servo controller 24 enters a track follow mode during which the transducer 14 is maintained in a substantially centered position above the target track. The bulk of the data transfer between the transducer 14 and the disk 12 occurs during this track follow mode.

The read/write channel 20 is operative for, among other things, performing the data transformations necessary to provide communication between the host computer 40 and the disk 12. For example, during a write operation, the read/write channel 20 converts digital data received from the host computer 40 into an analog write current for delivery to the transducer 14. During a read operation, the read/write channel 20 provides the data transformations necessary for converting an analog read signal received from the transducer 14 into a digital representation that can be recognized by the host computer 40. The read/write channel 20 is also operative for separating out servo information read by the transducer 14 from the analog read signal and for directing this servo information to the servo controller 24 for use in positioning the transducer 14.

The lookup table 26 is operative for storing maximum seek velocity values for use during seek operations in the disk drive 10 in accordance with one embodiment of the present invention. When the main controller 28 receives a read or write request from the host computer 40, it sends a seek request to the servo controller 24 requesting movement of the transducer 14 from a present track of the disk 12 to a target track. The servo controller 24 analyzes the seek request and accesses the lookup table 26 to retrieve an appropriate maximum seek velocity value to use during the seek operation. The servo controller 24 then generates a velocity profile for the seek operation using the retrieved maximum seek velocity value. The servo controller 24 generates the control signal $i_{control}$ based on the difference between a measured transducer velocity and the profile velocity.

Figure 4:
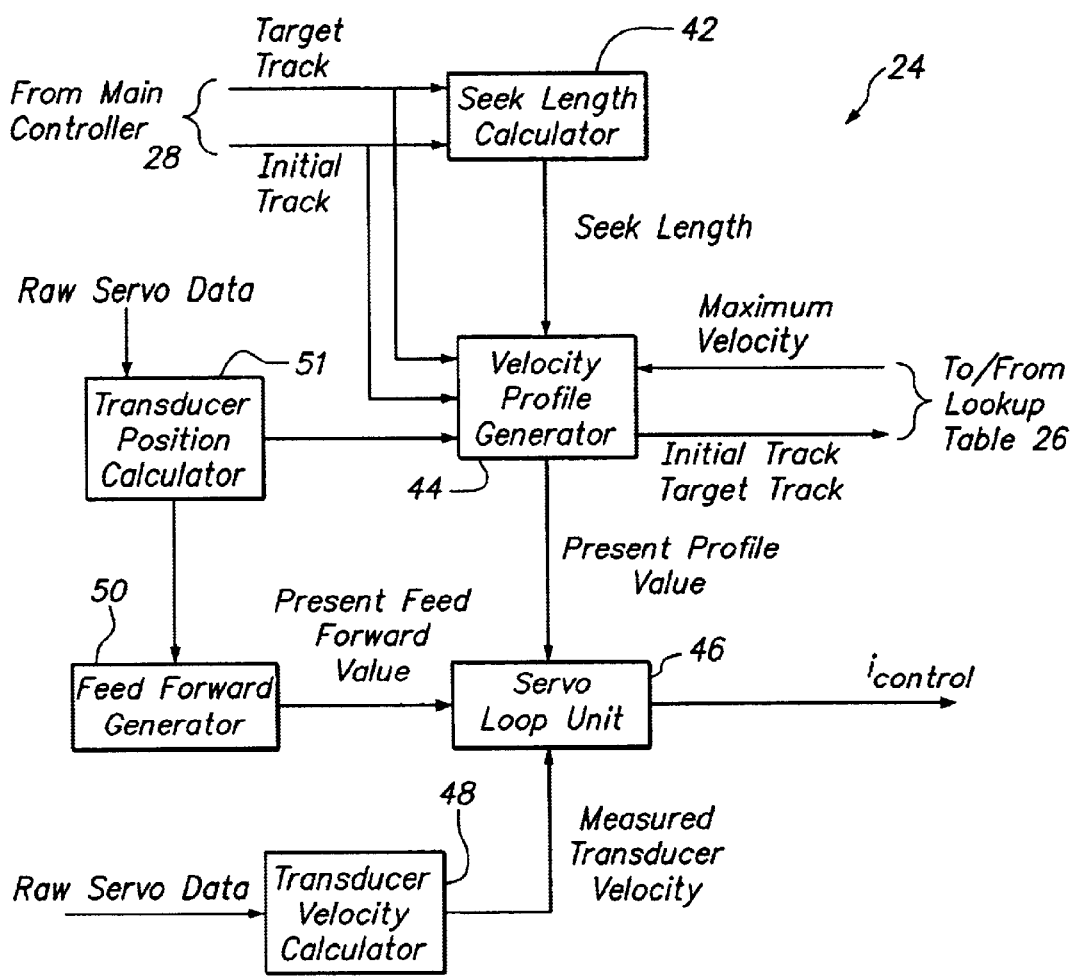
FIG. 4 is a block diagram illustrating a servo controller in accordance with one embodiment of the present invention.

FIG. 4 is a block diagram illustrating a servo controller 24 that can be used within the disk drive 10 of FIG. 3 in accordance with one embodiment of the present invention. As illustrated, the servo controller 24 includes: a seek length calculator 42, a velocity profile generator 44, a servo loop unit 46, a transducer velocity calculator 48, a feed forward generator 50, and a transducer position calculator 51. The seek length calculator 42 receives an indication of the initial track and the target track of a present seek operation from the central controller 28 and uses this information to determine the length of the seek operation. The seek length calculator 42 delivers the seek length information to the velocity profile generator 44 for use in generating a velocity profile for the requested seek operation. In a preferred embodiment of the invention, the seek velocity profile generated by the velocity profile generator 44 is limited by a maximum seek velocity when the length of the requested seek is greater than a predetermined value. Therefore, the velocity profile generator 44 will only retrieve a maximum seek velocity value from the lookup table 26 if the indicated seek length exceeds the predetermined value.

If the present seek operation has the requisite length, the velocity profile generator 44 addresses the lookup table 26 using an address that is indicative of at least the direction of the seek. In the illustrated embodiment, for example, the address includes information identifying both the initial track and the target track associated with the seek operation. Other addressing schemes are also possible. The lookup table 26 can be implemented using any form of addressable computer memory. After the velocity profile generator 44 has received the maximum seek velocity value from the lookup table 26, it proceeds to generate a velocity profile for the seek operation.

Figures 5, 6:
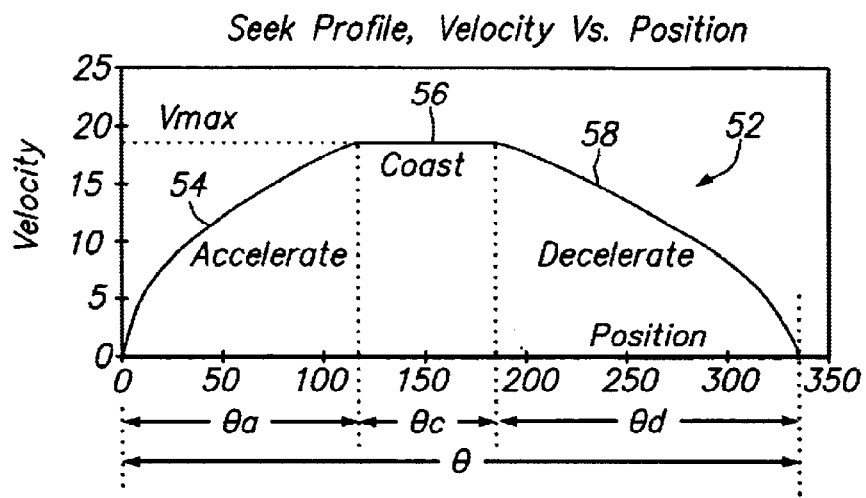
FIG. 5 is a graph illustrating a typical seek velocity profile that may be generated in accordance with one embodiment of the present invention.
FIG. 6 is a table illustrating an arrangement of stored data in a lookup table in accordance with one embodiment of the present invention.

The velocity profile is simply an indication of the desired transducer movement during the seek operation. FIG. 5 is a graph illustrating a typical seek velocity profile 52 that may be generated by the velocity profile generator 44. As illustrated, the seek velocity profile 52 is a plot illustrating the desired velocity of the transducer as a function of radial position during the seek operation. Velocity profiles can also be specified as a function of other variables (e.g., time) during the seek operation.

As shown in FIG. 5, the seek velocity profile 52 includes three distinct portions; namely, the acceleration portion 54, the coast portion 56, and the deceleration portion 58. During the acceleration portion 54 of the seek velocity profile 52, the transducer 14 is accelerated in a direction toward the target track from a stationary position above the initial track. When the velocity of the transducer 14 reaches the maximum seek velocity value, the seek velocity profile 52 transitions to the constant velocity coast portion 56 during which the transducer 14 coasts at the maximum seek velocity. Eventually, the seek velocity profile 52 enters the deceleration portion 58 during which the radial velocity of the transducer 14 is decreased from the maximum value to a value of zero at the target track.

Referring back to FIG. 4, the transducer position calculator 51 is operative for determining the present position of the transducer (i.e., the position at a most recent servo sample time) by processing the raw servo data received from the read/write channel 20. The transducer position calculator 51 delivers the transducer position indication to the velocity profile generator 44 and the feed forward generator 50. In response to this transducer position information, the velocity profile generator 44 outputs a profile velocity value corresponding to the indicated transducer position to the servo loop unit 46. Similarly, the feed forward generator 50 outputs a feed forward value corresponding to the indicated transducer position to the servo loop unit 46.

The transducer velocity calculator 48 is operative for determining the present velocity of the transducer (i.e., the velocity at a most recent servo sample time) by processing the raw servo data received from the read/write channel 20. The present velocity information is also delivered to the servo loop unit 46. The servo loop unit 46 then uses the present profile value, the present feed forward value, and the measured velocity value to modify the control signal $i_{control}$ that is delivered to the VCM 18 (see FIG. 3).

In one embodiment of the invention, the maximum seek velocity values corresponding to the different seek directions are programmed within the velocity profile generator 44 itself, thus dispensing with the need for a lookup table. For example, in one approach, an individual velocity profile generation routine is provided for each seek direction. The velocity profile generator 44 then executes an appropriate routine based on the particular seek operation being performed. In such an approach, each routine will include the appropriate maximum velocity value somewhere within its code. In another embodiment, the velocity profile generator 44 includes functionality (e.g., a machine implemented routine or equation) for use in determining a maximum seek velocity value for a particular seek operation. As described above, the goal of these different arrangements is to increase the likelihood of maintaining a minimum transducer fly height in the disk drive while having as little negative effect on average seek time as possible.

FIG. 6 is a table 60 illustrating the contents of a lookup table (e.g., lookup table 26 of FIG. 3) in accordance with one embodiment of the present invention. As illustrated, the table 60 includes a unique maximum seek velocity value for each of a plurality of different combinations of initial track region and target track region that may occur during a seek operation in a corresponding disk drive. The disk surface is divided into a plurality of radial regions (e.g., 5 regions in the illustrated embodiment), each having the same or a similar number of tracks. The number of radial regions that are defined on the disk surface will generally depend the anticipated fly height performance for a particular disk drive design. A maximum seek velocity value is thus selected for each seek operation based on the region of both the initial and the target track of the seek. In the illustrated embodiment, values are provided in the table 60 for outward directed seeks only. A single maximum velocity value is used for all inward directed seeks as fly height reductions are not generally a concern during these seeks. The single value for inward directed seeks can be stored, for example, in a separate memory location within the disk drive or within software within the drive. In an alternative approach, multiple values can be stored for each seek direction.

As can be appreciated, a plurality of other lookup table addressing schemes can also be implemented in accordance with the present invention. For example, in one embodiment, a unique maximum velocity value is stored for each zone of the disk for one or both of the seek directions. A maximum seek velocity value is then used during a seek that corresponds to the zone within which the seek is to be performed. For multi-zone seeks, the maximum velocity value corresponding to the zone of the initial track, the zone of the target track, or the zone of some intermediate track between the initial track and the target track can be used. Other techniques for arranging and retrieving maximum velocity values can also be used in accordance with the invention.

In one aspect of present invention, a disk drive is provided that allows the maximum seek velocity values used by the disk drive for inward and outward seeks to be periodically re-calibrated in the field during the life of the disk drive. This re-calibration is performed based upon changing operational conditions within the disk drive. The re-calibration can be programmed to occur at predetermined intervals or times or the re-calibration can be user initiated. After re-calibrated maximum seek velocity values have been generated, they are preferably substituted within the drive for the previous values used by the drive. For example, with reference to FIG. 3, the re-calibrated values could replace the values previously stored in the lookup table 26.

In one embodiment, the re-calibrated maximum seek velocity values are generated based upon knowledge of a present fly height condition within the disk drive. A fly height test is thus performed in the field to determine the present fly height condition and the results are used to calculate the re-calibrated maximum velocity values. In one approach, for example, information similar to that illustrated in FIG. 1 is generated during the fly height test. In another approach, information relating to known thermal asperities on the disk surface is used to update one or more of the maximum velocity values used by the disk drive. Other methods for determining the present transducer fly height condition are also possible. The re-calibration procedures are preferably implemented in software within the disk drive controller.

Figure 7:
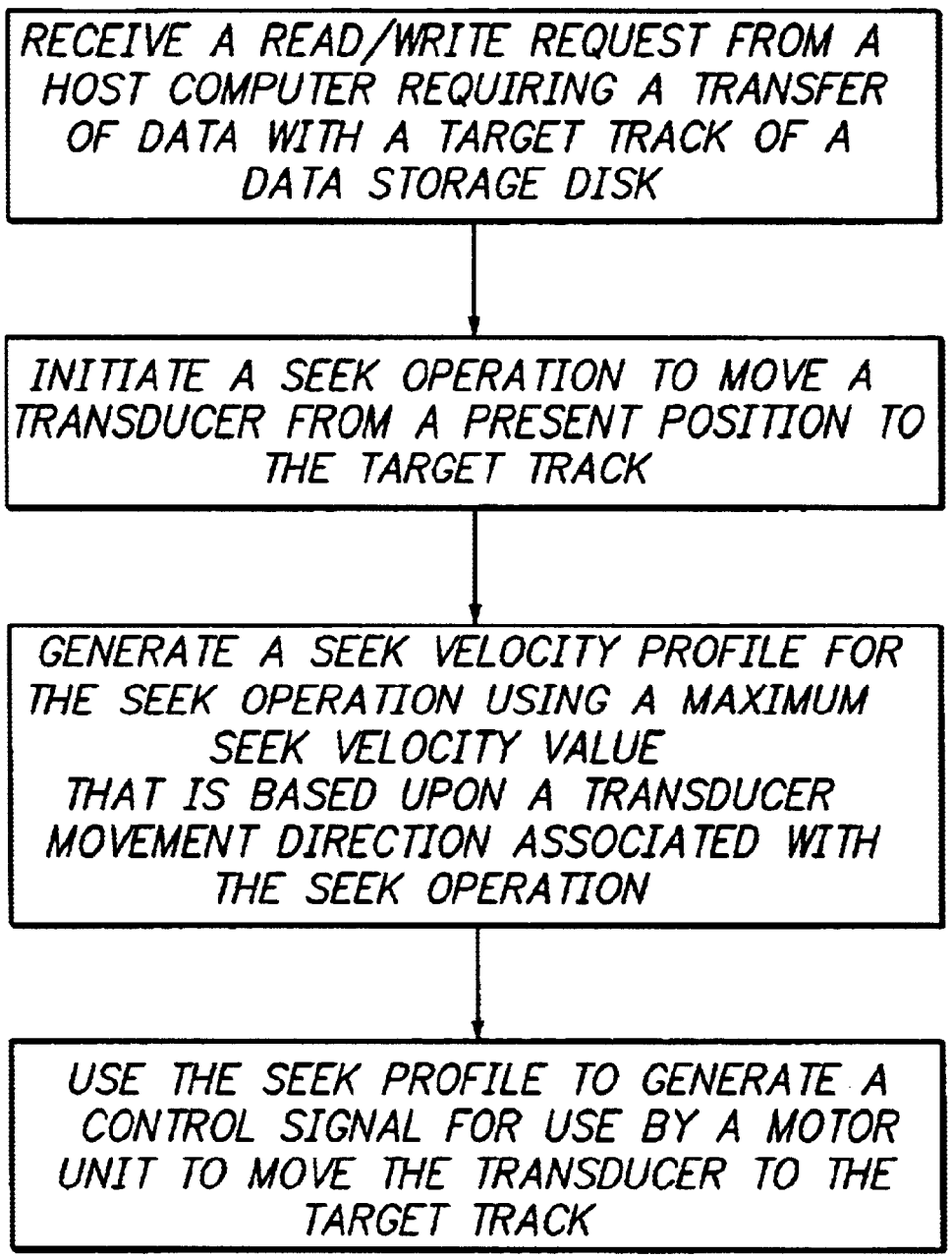
FIG. 7 is a flowchart illustrating a method for use in performing a read or write operation in a disk drive in accordance with one embodiment of the present invention.

FIG. 7 is a flowchart illustrating a method for use in performing a read or write operation in a disk drive in accordance with one embodiment of the present invention. First, an access request is received from an external host computer requiring a transfer of data with a target track of a data storage disk (step 100). A seek operation is subsequently initiated to move a transducer from a present position to the target track to carry out the access request (step 102). A seek velocity profile is next generated for the seek operation using a maximum seek velocity value that is based upon a transducer movement direction associated with the seek operation (step 104). After the seek profile has been created, it is used to generate a control signal for use by a motor unit (e.g., a voice coil motor) to move the transducer to the target track (step 106). In a preferred approach, the seek velocity profile is used as part of a servo control loop for generating a control signal based on a difference between the measured velocity and a desired velocity.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A disk drive comprising:

a data storage disk having a plurality of substantially concentric data tracks on a first disk surface thereof for use in storing user data, said plurality of substantially concentric data tracks including at least a first track and a second track;

a transducer for reading data from said first disk surface of said data storage disk;

an actuator assembly for moving said transducer in a substantially radial direction with respect to said first disk surface, said actuator assembly including an actuator arm coupled to said transducer for use in supporting said transducer in a position proximate to said disk surface and a motor unit coupled to said actuator arm for imparting motion to said transducer in response to a control signal;

a seek servo system for use in generating said control signal during a seek operation to move said transducer from an initial track position to a target track position, said seek servo system including a velocity profile generator for generating a velocity profile for use during said seek operation, wherein said velocity profile generator generates a first velocity profile having a first maximum seek velocity value for a first seek operation having said first track as an initial track and said second track as a target track and a second velocity profile having a second maximum seek velocity value for a second seek operation having said second track as an initial track and said first track as a target track, wherein said first maximum seek velocity value is different from said second maximum seek velocity value;

at least one memory for use in storing said first and second maximum seek velocity values for use by said velocity profile generator in generating said first and second velocity profiles; and, a re-calibration unit for use in modifying said maximum seek velocity values stored within said at least one memory based on present operating conditions within the drive.

2. The disk drive, as claimed in claim 1, wherein:

said at least one memory includes a plurality of maximum seek velocity values for use during outward directed seek operations.

3. The disk drive, as claimed in claim 2, wherein:

said first disk surface includes a number of different radial regions; and said plurality of maximum seek velocity values includes an individual value for each of a plurality of radial region combinations that can be involved in a seek operation.

4. The disk drive, as claimed in claim 2, wherein:
said plurality of maximum seek velocity values includes an individual value for each of a plurality of zones on the first disk surface.

5. The disk drive, as claimed in claim 1, wherein:
said re-calibration unit includes means for determining a present fly height condition within the disk drive.

6. The disk drive, as claimed in claim 1, wherein:
said re-calibration unit is activated upon expiration of a predetermined interval.

7. The disk drive, as claimed in claim 1, wherein:
said re-calibration unit is activated upon user command.

8. A method for use in performing a seek operation in a disk drive comprising the steps of:
determining a seek direction corresponding to the seek operation;
generating a seek velocity profile for the seek operation using a maximum seek velocity value associated with said seek direction, wherein said maximum seek velocity value is retrieved from a memory device;
creating a control signal for delivery to a voice coil motor during said seek operation based on said seek velocity profile; and,
recalibrating said maximum seek velocity value due to a change in operational conditions in the disk drive.

9. The method, as claimed in claim 8, wherein:
said step of retrieving includes addressing said memory device using an address that is related to said seek direction.

10. The method, as claimed in claim 8, wherein:
said step of generating a seek velocity profile includes selecting a profile generation routine for execution based upon said seek direction.

11. A computer readable medium or media encoded with processing instructions for performing the method of claim 8 when executed within a processing device.

12. A seek control system for use in a disk drive to position a transducer for use in transferring data with a data storage disk, comprising:
means for receiving a seek command indicating a target track of the data storage disk to which the transducer is to be moved;
means for determining a motion related characteristic associated with said seek command;
means for generating a seek velocity profile for use in performing said seek command using a maximum seek velocity value that is selected based upon said motion related characteristic associated with said seek command, wherein said means for generating retrieves said maximum seek velocity value from an addressable memory in which a plurality of maximum seek velocity values are stored; and,
means for recalibrating said maximum seek velocity values based upon a change in operational conditions in the disk drive.

13. The seek control system, as claimed in claim 12, wherein:
said means for determining a motion related characteristic includes means for determining a seek direction associated with said seek command.

14. The seek control system, as claimed in claim 12, wherein:
said means for determining a motion related characteristic includes means for determining a radial track location associated with said seek command.

15. The seek control system, as claimed in claim 12, wherein:
said means for generating includes means for selecting a seek profile generation routine from a plurality of generation routines for use in generating said seek velocity profile based on said motion related characteristic.

16. A method for use in a disk drive manufacturing environment, comprising the steps of:
determining a plurality of maximum seek velocity values for use by a disk drive to generate seek velocity profiles, including determining a first maximum seek velocity value corresponding to an outward directed seek operation and a second maximum seek velocity value corresponding to an inward directed seek operation, wherein said first maximum seek velocity value is different from said second maximum seek velocity value;
storing said plurality of maximum seek velocity values within said disk drive;
programming said disk drive to select a first of said plurality of maximum seek velocity values for use during a first seek operation based upon a characteristic associated with said first seek operation; and,
recalibrating at least one of said plurality of maximum seek velocity values and storing said recalibrated value within said disk drive.

17. The method, as claimed in claim 16, wherein:
said step of determining a plurality of maximum seek velocity values includes determining values based upon a desired minimum transducer fly height.

18. The method, as claimed in claim 16, wherein:
said characteristic associated with said first seek operation includes a seek direction of said first seek operation.

19. The method, as claimed in claim 16, wherein:
said characteristic associated with said first seek operation includes a radial disk location associated with said first seek operation.

20. The method, as claimed in claim 16, wherein:
said step of storing includes storing said plurality of maximum seek velocity values within an addressable memory within the disk drive.

21. The method, as claimed in claim 16, wherein:
said step of storing comprises including said values within one or more software routines stored within the disk drive.

22. A disk drive comprising:
a disk;
a transducer for reading information from the disk;
a servo controller that uses first maximum velocity values during seek operations in which the transducer moves towards an outer diameter of the disk and uses second maximum velocity values, different from the first maximum velocity values, during seek operations in which the transducer moves towards an inner diameter of the disk; and,
a re-calibration unit that adjusts at least one of the first maximum velocity values in response to an operational condition of the disk drive.

23. The disk drive, as claimed in claim 22, wherein the first maximum velocity values vary by seek lengths.

24. The disk drive, as claimed in claim 22, wherein the first maximum velocity values vary by zones on the disk.

25. The disk drive, as claimed in claim 22, wherein the first maximum velocity values are provided only for seek lengths that exceed a predetermined value.

26. The disk drive, as claimed in claim 22, wherein the first maximum velocity values vary by seek length and the second maximum velocity values vary by seek length.

27. The disk drive, as claimed in claim 26, wherein the first and second maximum velocity values are provided only for seek lengths that exceed a predetermined value.

28. The disk drive, as claimed in claim 22, wherein the first maximum velocity values are each at least 10 inches per second less than at least one of the second maximum velocity values.

29. The disk drive, as claimed in claim 22, wherein the first maximum velocity values are each at least 20 inches per second less than at least one of the second maximum velocity values.

30. The disk drive, as claimed in claim 22, further comprising an addressable memory that stores the first maximum velocity values.

31. The disk drive, as claimed in claim 22, wherein the operational condition is a flying height of the transducer.

32. The disk drive, as claimed in claim 22, wherein during a seek operation, the servo controller generates a seek velocity profile in response to a selected maximum velocity value from the first and second maximum velocity values.

33. The disk drive, as claimed in claim 32, wherein the seek velocity profile includes an acceleration portion, a maximum velocity portion that corresponds to the selected maximum velocity value, and a deceleration portion.

34. The disk drive, as claimed in claim 33, wherein the servo controller provides a voice coil motor control signal in response to the seek velocity profile.

35. The disk drive, as claimed in claim 22, wherein the servo controller includes:

a seek length calculator that provides a seek length in response to identification of initial and target tracks on the disk;

a transducer position calculator that provides a transducer position in response to servo data the transducer reads from the disk;

a transducer velocity calculator that provides a transducer velocity in response to the servo data;

a feed forward generator that provides a feed forward value in response to the transducer position;

a velocity profile generator that provides a seek velocity profile in response to the seek length, the transducer position, and a maximum velocity value selected from the first and second maximum velocity values in response to the identification of the initial and target tracks; and a servo loop unit that provides a voice coil motor control signal in response to the seek velocity profile, the feed forward value and the transducer velocity.

36. The disk drive, as claimed in claim 35, further including a lookup table that provides the maximum velocity value to the velocity profile generator in response to the identification of the initial and target tracks.

37. The disk drive, as claimed in claim 22, wherein differences between the first and second maximum velocity values reduce differences in flying height of the transducer during seek operations towards the outer and inner diameters that would otherwise occur if the first and second maximum velocity values were identical.

38. The disk drive, as claimed in claim 22, wherein for seeks that exceed a predetermined length, an average seek time towards the outer diameter is at least 10 percent greater than an average seek time towards the inner diameter.

39. The disk drive, as claimed in claim 38, wherein for seeks that do not exceed the predetermined length, the average seek time towards the outer diameter is essentially identical to the average seek time towards the inner diameter.

40. The disk drive, as claimed in claim 22, wherein the first maximum velocity values are determined by testing the disk drive.

41. The disk drive, as claimed in claim 22, wherein the first maximum velocity values are determined without testing the disk drive.

42. The disk drive, as claimed in claim 22, wherein the first maximum velocity values are determined before the disk drive is manufactured.

43. The disk drive, as claimed in claim 22, wherein the first maximum velocity values are determined as the disk drive is manufactured.

* * * * *